United States Patent [19]
Sato et al.

[11] Patent Number: 5,173,950
[45] Date of Patent: Dec. 22, 1992

[54] COLOR IMAGE TRANSFERRING METHOD AND APPARATUS

[75] Inventors: Tatunari Sato, Tsuchiura; Yukio Yamamoto, Ibaraki; Keiji Kunimi, Katsuta, all of Japan

[73] Assignees: Hitachi, Ltd.; Hitachi Koki Co., Ltd., both of Tokyo, Japan

[21] Appl. No.: 696,019

[22] Filed: May 6, 1991

[30] Foreign Application Priority Data

May 11, 1990 [JP] Japan ................ 2-119847

[51] Int. Cl.[5] .............................. G06K 9/40
[52] U.S. Cl. ........................... 382/54; 382/17; 358/75; 358/80; 358/298
[58] Field of Search ............... 358/75, 80, 455, 456, 358/457, 465, 466, 298; 382/17, 54

[56] References Cited

U.S. PATENT DOCUMENTS 5,117,293  5/1992  Asada et al. .............. 358/80
5,113,248  5/1992  Hibi et al. ................ 358/75

Primary Examiner—Jose Couso
Attorney, Agent, or Firm—Evenson, Wands, Edwards, Lenahan & McKeown

[57] ABSTRACT

In transferring color image data having a tone on a recording paper, a threshold matrix data for adjusting the tone is selected in accordance with the image data having a dot arrangement. The threshold conversion curve of the threshold matrix data selected is used to correct a variation in the tone of the image data due to mechanical and electrical variations in a color image transferring apparatus including variations in the rotation speed of a transferring drum, a power source voltage to be applied to a transferring head and a relative position between the transferring drum and the recording paper. This correction can achieve improved transference of the image data on the recording paper.

14 Claims, 16 Drawing Sheets

FIG. 10

| 49  | 145 | 193 | 225 | 233 | 201 | 153 | 57  |
|-----|-----|-----|-----|-----|-----|-----|-----|
| 113 | 81  | 1   | 161 | 169 | 9   | 89  | 121 |
| 177 | 17  | 65  | 97  | 105 | 73  | 25  | 185 |
| 241 | 209 | 129 | 33  | 41  | 137 | 217 | 249 |
| 253 | 221 | 141 | 45  | 37  | 133 | 213 | 245 |
| 189 | 29  | 77  | 109 | 101 | 69  | 21  | 181 |
| 125 | 93  | 13  | 173 | 165 | 5   | 85  | 117 |
| 61  | 157 | 205 | 237 | 229 | 197 | 149 | 53  |

FIG. 11

| 13 | 37 | 49 | 57 | 59 | 51 | 39 | 15 |
|----|----|----|----|----|----|----|----|
| 29 | 21 | 1  | 41 | 43 | 3  | 23 | 31 |
| 45 | 5  | 17 | 25 | 27 | 19 | 7  | 47 |
| 61 | 53 | 33 | 9  | 11 | 35 | 55 | 63 |
| 64 | 56 | 36 | 12 | 10 | 34 | 54 | 62 |
| 48 | 8  | 20 | 28 | 26 | 18 | 6  | 46 |
| 32 | 24 | 4  | 44 | 42 | 2  | 22 | 30 |
| 16 | 40 | 52 | 60 | 58 | 50 | 38 | 14 |

FIG. 13

| 3 | 5 | 8 | 8 | 5 | 3 |
|---|---|---|---|---|---|
| 7 | 1 | 4 | 4 | 1 | 7 |
| 9 | 6 | 2 | 2 | 4 | 9 |
| 9 | 6 | 2 | 2 | 4 | 9 |
| 7 | 1 | 4 | 4 | 1 | 7 |
| 3 | 5 | 8 | 8 | 5 | 3 |

FIG. 14

| 4  | 12 | 16 | 20 | 24 | 24 | 20 | 16 | 12 | 4  |
|----|----|----|----|----|----|----|----|----|----|
| 11 | 2  | 6  | 14 | 21 | 21 | 14 | 6  | 2  | 11 |
| 19 | 7  | 1  | 8  | 17 | 17 | 8  | 1  | 7  | 9  |
| 23 | 15 | 9  | 3  | 10 | 10 | 3  | 9  | 15 | 23 |
| 25 | 22 | 18 | 13 | 5  | 5  | 13 | 18 | 22 | 25 |
| 25 | 22 | 18 | 13 | 5  | 5  | 13 | 18 | 22 | 25 |
| 23 | 15 | 9  | 3  | 10 | 10 | 3  | 9  | 15 | 23 |
| 19 | 7  | 1  | 8  | 17 | 17 | 8  | 1  | 7  | 19 |
| 11 | 2  | 6  | 14 | 21 | 21 | 14 | 6  | 2  | 11 |
| 4  | 12 | 16 | 20 | 24 | 24 | 20 | 16 | 12 | 4  |

FIG. 15

| 10 | 30 | 38 | 46 | 44 | 32 | 12 |
|----|----|----|----|----|----|----|
| 26 | 18 | 2  | 34 | 8  | 20 | 28 |
| 42 | 6  | 14 | 22 | 16 | 4  | 40 |
| 49 | 37 | 25 | 1  | 23 | 35 | 47 |
| 41 | 5  | 17 | 24 | 15 | 7  | 43 |
| 29 | 21 | 9  | 36 | 3  | 19 | 27 |
| 13 | 33 | 45 | 48 | 39 | 31 | 11 |

FIG. 16

| 14 | 46 | 62 | 70 | 78 | 72 | 64 | 45 | 16 |
|----|----|----|----|----|----|----|----|----|
| 38 | 26 | 2  | 50 | 66 | 52 | 4  | 28 | 40 |
| 55 | 6  | 22 | 30 | 42 | 32 | 24 | 8  | 60 |
| 74 | 54 | 34 | 10 | 18 | 12 | 36 | 56 | 76 |
| 81 | 69 | 45 | 21 | 1  | 19 | 43 | 67 | 79 |
| 77 | 57 | 37 | 13 | 20 | 11 | 35 | 55 | 75 |
| 61 | 9  | 25 | 33 | 44 | 31 | 23 | 7  | 59 |
| 41 | 29 | 5  | 53 | 68 | 51 | 3  | 27 | 39 |
| 17 | 49 | 65 | 73 | 80 | 71 | 63 | 47 | 15 |

FIG. 17

| 13 | 37 | 49 | 57 | 59 | 51 | 39 | 15 |
|----|----|----|----|----|----|----|----|
| 29 | 21 | 1  | 41 | 43 | 3  | 23 | 31 |
| 45 | 5  | 17 | 25 | 27 | 19 | 7  | 47 |
| 61 | 53 | 33 | 9  | 11 | 35 | 55 | 63 |
| 64 | 56 | 36 | 12 | 10 | 34 | 54 | 62 |
| 48 | 8  | 20 | 28 | 26 | 18 | 6  | 46 |
| 32 | 24 | 4  | 44 | 42 | 2  | 22 | 30 |
| 16 | 40 | 52 | 60 | 58 | 50 | 38 | 14 |

FIG. 18

| 64 | 56 | 36 | 12 | 10 | 34 | 54 | 62 |
|----|----|----|----|----|----|----|----|
| 48 | 8  | 20 | 28 | 26 | 18 | 6  | 46 |
| 32 | 24 | 4  | 44 | 42 | 2  | 22 | 30 |
| 16 | 40 | 52 | 60 | 58 | 50 | 38 | 14 |
| 13 | 37 | 49 | 57 | 59 | 51 | 39 | 15 |
| 29 | 21 | 1  | 41 | 43 | 3  | 23 | 31 |
| 45 | 5  | 17 | 25 | 27 | 19 | 7  | 47 |
| 61 | 53 | 33 | 9  | 11 | 35 | 55 | 63 |

| 10 | 26 | 48 | 16 | 12 | 28 | 46 | 14 |
|----|----|----|----|----|----|----|----|
| 42 | 58 | 60 | 32 | 44 | 64 | 62 | 30 |
| 23 | 55 | 49 | 33 | 21 | 53 | 51 | 35 |
| 7  | 39 | 17 | 1  | 5  | 37 | 19 | 3  |
| 11 | 27 | 45 | 13 | 9  | 25 | 47 | 15 |
| 43 | 63 | 61 | 29 | 41 | 57 | 59 | 31 |
| 22 | 54 | 52 | 36 | 24 | 56 | 50 | 34 |
| 6  | 38 | 20 | 4  | 8  | 40 | 18 | 2  |

COLOR IMAGE TRANSFERRING METHOD AND APPARATUS

BACKGROUND OF THE INVENTION

The present invention relates to a method and apparatus for transferring a color image with the tone represented in pixels arranged in a matrix shape.

Previously known techniques for acquiring an image having a tone in a fused-type thermal printer includes a density pattern method and a dizzer method. The tone representation in these methods have generally used a fattering dot type, a Bayer type and a spiral type of a tone threshold matrix table. FIG. 25 shows a fattering dot type pattern in which red is represented by a tone threshold matrix. In the pattern shown in FIG. 25, one pixel consists of 6 yellow (Y) dots and 6 magenta (M) dots, and each dot is displaced in the vertical direction. Additionally, there has been the JP-A-61-113363 as a known technique of reducing color unevenness using the threshold matrix.

SUMMARY OF THE INVENTION

It is an object of the present invention to provide color image transferring method and apparatus capable of reducing color unevenness by adjusting a predetermined tone threshold matrix in accordance with variation in the relative position relationship between a transferring head and a recording paper, the transferring energy from the former to the latter, etc. thereby achieving transference of an improved image.

In order to achieve the above object, variations are detected such as a relative position between a transferring head and a paper, and electric power applied to the transferring head, then a threshold level of threshold matrix data is controlled by signals corresponding to the variations to thereby compensate electrical and mechanical variations caused by a color image transferring apparatus.

Also, number of image data transferred to the transferring head can be increased and decreased in accordance with the variation signals.

Transferring energy applied to the transferring head can also be controlled by the variation signals.

Furthermore, each of the variation signal is passed through a low pass filter to acquire only its low frequency variation component. The low frequency variation is passed through a correction table in which the control value corresponding to the variation component is previously set thereby to control the energy to be supplied and the threshold level.

The threshold value matrix data include a plurality of threshold value matrix data of 3×3, 4×4 or 5×5 which are arranged in a square shape. In each threshold data matrix data, transferring dots change in the low tone toward the high tone with a slope, and relationship between the threshold matrix data of changing direction of the dots is alternately inverted vertically and horizontally.

The threshold matrix data can be set in other manners. For example, the threshold matrix data of 4×4 is arranged with an overlap of single row and single column so that the tone changes with slopes in four directions from its center.

Also, the threshold matrix data of 4×4 is arranged with a gap of single row and single column so that the tone changes with slopes in four direction from its center and also the gap of single row and single column will be transferred starting from the center.

In order to reduce the color unevenness, the threshold matrix data is combined with a fattering dot type threshold matrix data in which transferring dots changes vertically and horizontally from its center so that the centers of pixels transferred for each color are obliquely displaced in vertical and horizontal directions.

The color unevenness is mainly due to a variation in the low frequency component. Therefore, the color unevenness can be reduced by controlling such a gentle variation component to control the energy to be supplied to a transferring head or the threshold level of adjusting the tone.

The threshold matrix data in the present invention has dots succeeding in four directions from the low tone so that a protruding portion and an overlapping portion compensate for each other to remove the color unevenness.

Furthermore, the threshold matrix data are displaced for color to create binary-digitized image signals and these signals are subjected to overlapping transference so that a protruding portion and an overlapping portion compensate for each other to remove the color unevenness.

BRIEF DESCRIPTION OF THE DRAWINGS

FIGS. 10 and 11 are views showing examples of threshold matrix data stored in the threshold matrix table shown in FIG. 3;

FIGS. 13 to 16 are views of examples of threshold matrix data of 3×3, 5×5, 7×7 and 9×9, respectively;

FIGS. 17 to 19 are views showing examples of threshold matrix data used in the method of displacing the tone pattern using three colors of Y (yellow), M (magenta) and C (cyan);

FIG. 20 is a view of the overlapping pattern resulting from overlapping transference using the threshold matrix data shown in FIGS. 17 to 19;

DESCRIPTION OF THE PREFERRED EMBODIMENTS

Embodiments of the present invention are described with reference to drawings.

Previously known image transference techniques include the types of thermal transference, ink jet, and electrophotograph, etc. The present invention can be applied to the image transference method in which ink or toner is deposited on a recording paper using a transferring head to represent the tone of an image by plural dots. Now, an explanation will be given of an embodiment applied to a fused-type thermal color printer.

Figure 1:
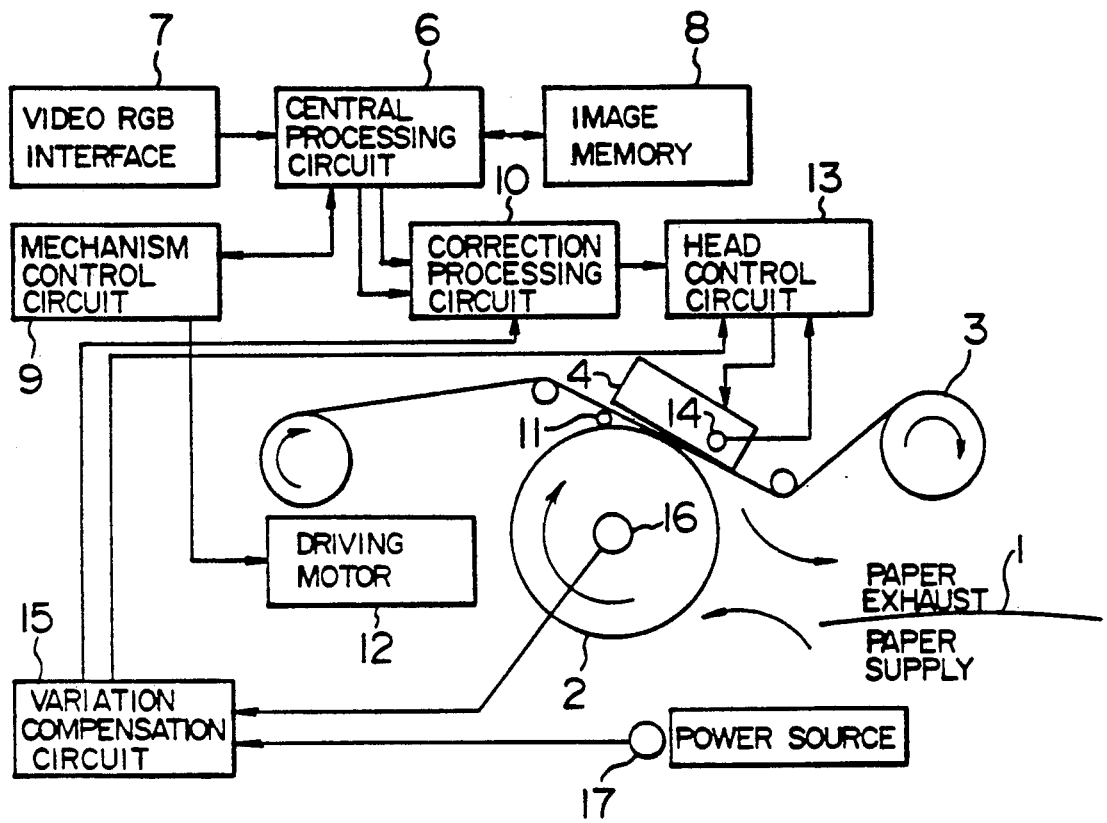
FIG. 1 is a schematic diagram showing the entire arrangement of one embodiment of the present invention.
Figure 2:
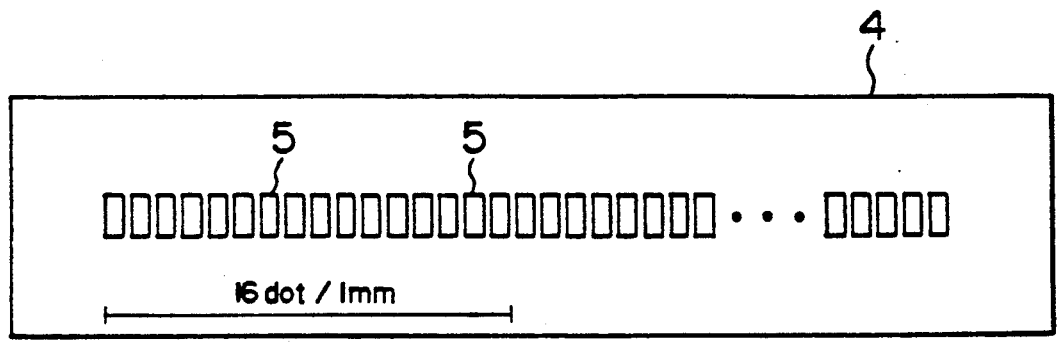
FIG. 2 is a schematic diagram of the transferring head employed in the embodiment of FIG. 1.

FIG. 1 shows the entire arrangement of a fused-type thermal color printer. The color printer transfers in the order of colors Y (yellow), M (magenta) and C (cyan) to a recording paper rolled on a drum 2 while an ink film 3 is forwarded in the rotation direction of the drum 2. The ink is previously applied to the ink film in the order of Y-M-C. A transferring head 4 generates heat owing to supply of the current corresponding to an image from a head control circuit 13 to melt the ink and transfers the ink corresponding to the image on the recording paper. Although the transferring head 4 employed in this embodiment has heat resistors 5 arranged with a dot density of 16 lines/mm, it may have the resistors 5 arranged with the other dot density.

A central processing circuit 6 takes input image data from a video RGB interface 7 therein and stores them in an image memory 8. Furthermore, the central processing circuit 6 sends a print starting command to a mechanism control circuit 9 and also sends image data to a correction processing circuit 10. In response to an input signal received from a top sensor 11 and others, the mechanism control circuit 9 makes mechanism control including paper supply and exhaust, drum driving, retraction of the transferring head, rolling the ink film 3, etc. The top sensor 11 detects the tip of the recording paper 1 to inform the mechanism control circuit 9 of a print starting position. A drive motor 12 is a power source of the above control operation. A correction processing circuit 10 takes the image data therein to carry out its logarithm conversion, conversion of RGB (red, green and blue) data which are primary colors of the image data into YMC (yellow, magenta and cyan) data which are primary colors for transference, color correction and tone correction (binary-digitizing) and sends the binary-digitized image data to the head control circuit 13. The head control circuit 13 determines the electric energy to be supplied to the heat resistors 5 on the basis of a signal from a head temperature detecting sensor 14 and the amount of heat stored in the heat resistors 5 to control each of the heat resistors 5 of the transferring head 4. A variation compensation circuit 15 calculates an amount of compensation on the each basis of the signals supplied from a drum speed detecting sensor 10 and a power supply variation detecting sensor 17 thereby to control the threshold level for converting the image data into binary-digitized data by the correction processing circuit 10 and the electric energy to be supplied to the transferring head 4 which is determined by the head control circuit 13. Additionally, the variation compensation circuit 15 includes the following controls, each of which is a part of the present invention: controlling the threshold level used to binary-digitize the image data using a signal supplied from the drum speed detecting sensor 16; controlling the threshold level used to binary-digitize the image data using a signal supplied from the head power supply variation detecting sensor 17; controlling the threshold level used to binary-digitize the image data using signals supplied from the drum speed detecting sensor 16 and the head power supply variation detecting sensor 17; controlling the threshold level used to binary-digitize the image data and the electric energy to be supplied to the transferring head 4 using a signal supplied from the drum speed detecting sensor 16; and controlling the threshold level used to binary-digitize the image data and the electric energy to be supplied to the transferring head 4 using a signal supplied from the head power supply variation detecting sensor 17. The drum speed detecting sensor 16 detects the peripheral speed using an encoder located on a central shaft of the drum 2. As long as the transmission error in a driving force transmission system is small, a variation in the speed of the driving motor 12 may be detected. Otherwise, the peripheral speed of the drum 2 may be detected by a magnetic sensor which can be fabricated by applying or bonding magnetic substance on the drum 2. Furthermore, a variation in the transferring position may be fed back instead of the speed variation.

Figure 3:
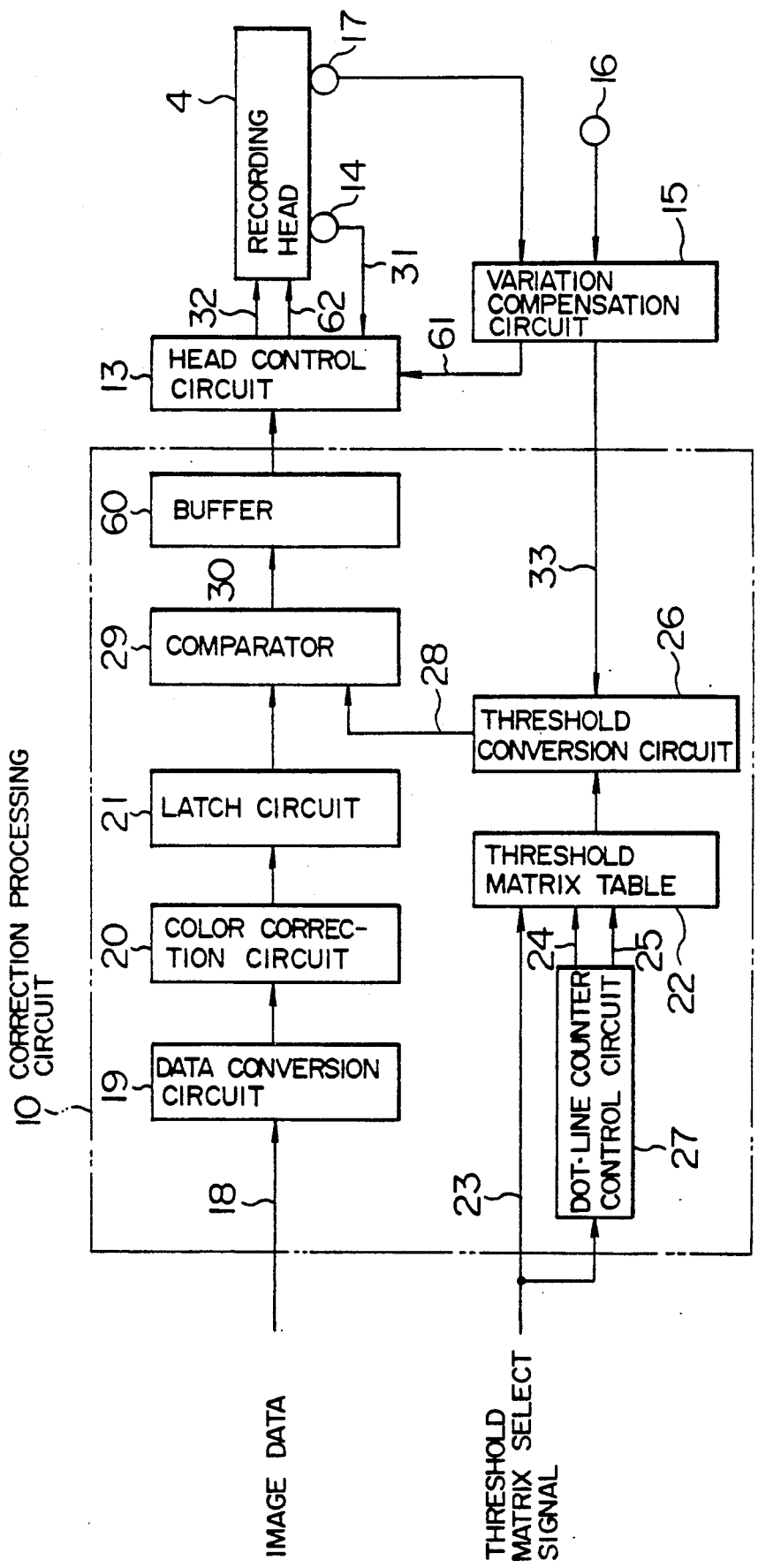
FIG. 3 is a block diagram of the concrete arrangement of the correction processing circuit 10 in the embodiment of FIG. 1.
Figure 5:
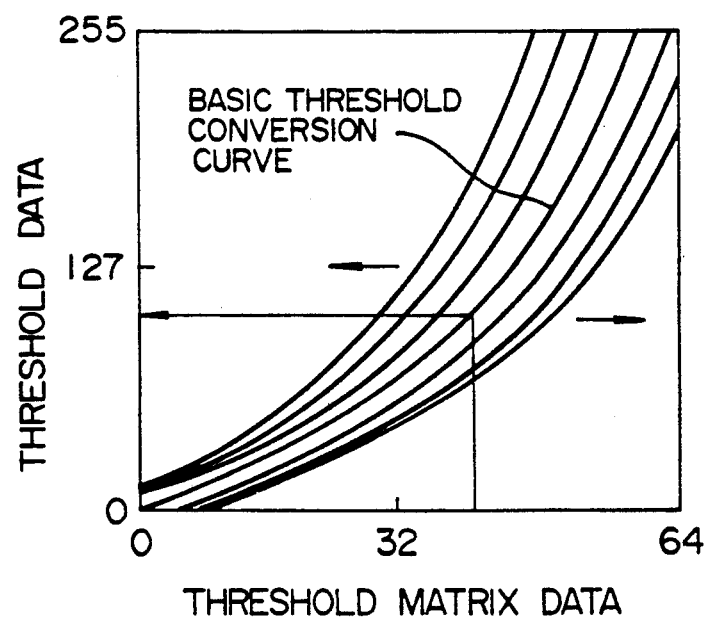
FIG. 5 is a graph showing examples of the threshold conversion curve corresponding to a transference variation.

FIG. 3 shows a concrete arrangement of the correction processing circuit 10. In FIG. 3, an image data 18 is logarithm-converted and RGB-YMC converted by a data conversion circuit 19, and further color-corrected by a color correction circuit 20. A latch circuit 21 latches the image data color-corrected by the amount corresponding to eight times of transference if a threshold matrix of 8×8 is selected. A threshold matrix table 22 stores several threshold matrix data as described later, and sends the data addressed by a threshold matrix select signal 23, a line counter signal 24 and a dot counter signal 25 to a threshold conversion circuit 26. A dot/line counter controlling circuit 27 generates the line counter signal 24 and the dot counter signal 25 corresponding to the size of the selected threshold matrix in response to the threshold matrix select signal 23. The threshold matrix select signal 23 serves to select one of several threshold matrices. The dot counter signal 25 indicates the horizontal position of the selected threshold matrix, and the line counter signal 24 indicates the vertical position of the selected threshold matrix. The matrix table 22 specifices single threshold data using these signals. The threshold matrix conversion circuit 26 stores a plurality of threshold conversion curves as shown in FIG. 5. Using a selected conversion curve, the threshold matrix conversion circuit 26 converts the threshold matrix data sent from the threshold matrix table 22 into a threshold data 28. The threshold matrix data stored in the threshold matrix table 22 will be described later in detail with reference to FIGS. 10 and 11.

A comparator 29 compares the threshold data 28 with the image data latched by the latch circuit 21. If the image data 18 is larger than the threshold data 28, the comparator 29 produces a binary-digitized image signal of "1", and if the image data 18 is smaller than the threshold data 28, the comparator 29 produces a binary-digitized image signal of "1". A buffer 60 holds the binary-digitized image signal selected from the comparator 29 by one line which will be, in turn, sent to the head control circuit 13. Now if the threshold matrix data of 8×8 dots are selected on a CRT field of 512×512 pixels, the binary-digitized signal 30 corresponding to single line includes 4096 (512×8) dots.

The head control circuit 13 determines the transferring energy on the basis of the single line image data from the buffer 60, a head temperature data 31 from the head temperature detecting sensor 14 and a transferring energy controlling signal 61 from the variation compensation circuit 15 to send to the transferring head 4 a transference data 32 and a pulse width signal 62 to be applied to the heat resistors 5. The transferring head 4 supplies currents to each of the heat resistors 5 in accordance with the signals sent from the head control circuit 13.

The above threshold conversion circuit 26 has two functions. One is to correct the tone characteristic of a printer. Specifically, the conversion circuit 26 holds a basic threshold conversion curve for setting the tone characteristic of the printer to be a desired tone characteristic. The other is to correct a variation in the image density due to a variation in the speed of a recording paper, and the like. Specifically, the threshold conversion circuit 26 also stores threshold conversion curves which are formed by shifting the above basic threshold curves right and left, and by multiplying the basic threshold curve by coefficients. The threshold conversion circuit 26 selects one of these threshold conversion curves on the basis of a threshold conversion curve select signal 33 to create the threshold data 28 and correct the above density change using this threshold data 28.

Figure 4:
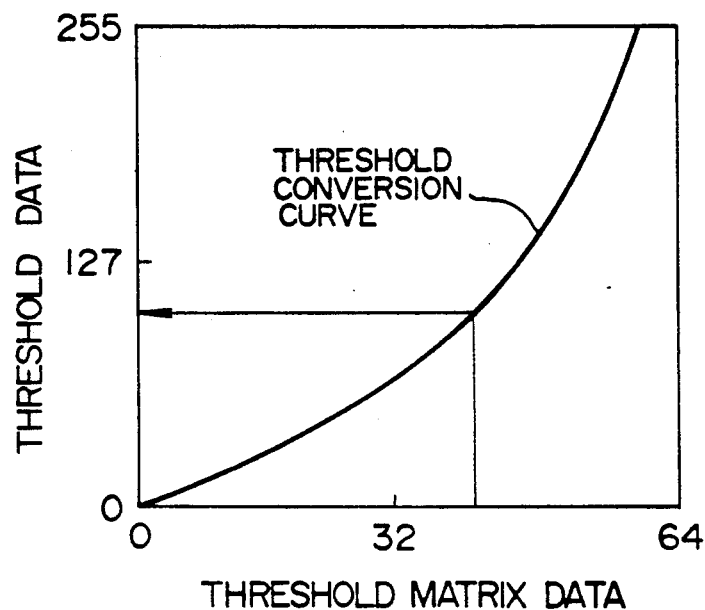
FIG. 4 is a graph showing a threshold conversion curve.

FIG. 4 shows a basic threshold conversion curve for setting the tone characteristic of the printer to be a desired tone characteristic. The tone characteristic represents the density characteristic of a printer corresponding to input image data with the value of "0" to "255". The desired tone characteristic is generally a linear density. If the threshold data is reduced on the basis of the threshold conversion curve which is convex downward, the number of dots transferred is increased to enhance the density. The conversion curve shown in FIG. 4 is set to give a desired linear density.

FIG. 5 shows threshold conversion curves which are formed by shifting the above basic threshold curves right and left, and by multiplying the basic threshold curve by coefficients. The threshold conversion circuit 26 selects one of these threshold conversion curves on the basis of a threshold conversion curve select signal 33 from the variation compensation circuit 15 to create the threshold data 28.

More specifically, if the relative speed between the transferring head 4 and the recording sheet of paper 1 becomes low, the moving distance of the ink film 4 will become short correspondingly. Thus, the area of dots transferred will become small so that the density of the corresponding region becomes low. If one pixel of an input image data is designed in a 4×4 tone matrix, the tone is represented by the number and pattern of dots transferred, reduction of the density can be compensated for by increasing the number of dots transferred. The number of dots transferred can be increased by reducing the threshold data 28 which is to be compared with the input image data. The threshold data 28 can be reduced by selecting one of the threshold conversion curves located right with respect to the basic threshold conversion curve as shown in FIG. 5. Furthermore, if the power supply voltage is reduced, the transferring energy will be also reduced, thereby reducing the area of dots transferred. Therefore, in this case also, one of the threshold conversion curves should be selected. Which one of the threshold conversion curves should be selected is determined by taking one of the threshold conversion curve select signals 33 previously tabulated corresponding to variations.

The threshold conversion circuit 26 converts matrix data from the threshold matrix table 22 into the threshold data 28 by using the threshold conversion curve which selected by the threshold conversion curve select signal 33.

The variation compensation circuit 15 receives signals from the drum speed detecting sensor 16 and the head power source variation detecting sensor 17 to produce the threshold conversion curve select signal 33 and a transferring energy controlling signal 61.

Figure 6:
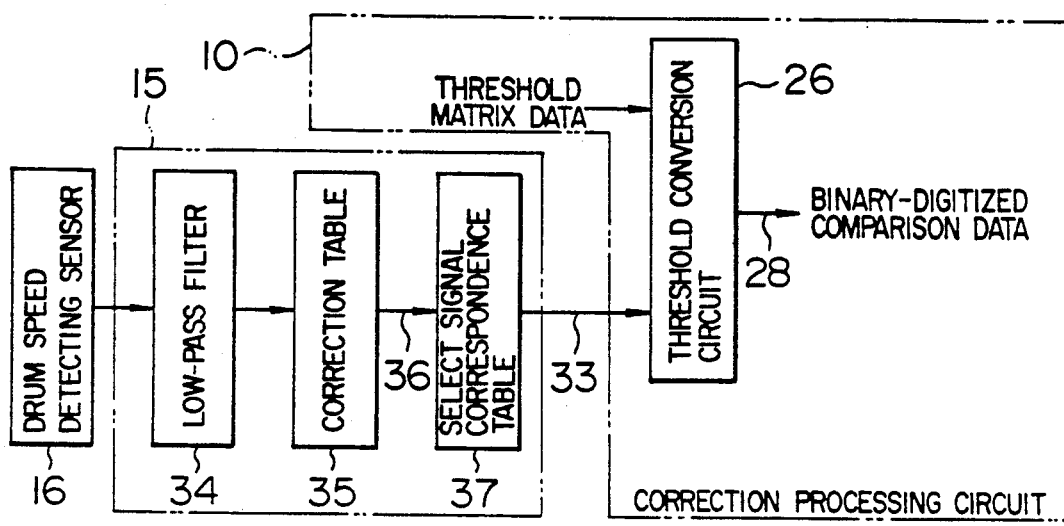
FIGS. 6 and 7 are block diagrams of the concrete arrangements of the variation compensation circuit 15.

FIG. 6 shows an example of the variation compensation circuit 15 which determines the threshold conversion curve using the signal from the drum speed detecting sensor 16.

The signal from the drum speed detecting sensor 16 is composed of a high frequency component called a jitter and a low frequency component due to a gentle speed variation. Undesired color unevenness is caused by overlap of colors each having density unevenness which is mainly due to the gentle speed variation. Although a variation in the power source voltage leads to the color unevenness, an explanation will be given of only the speed variation.

A low-pass filter 34 cuts the high frequency component of the signal from the drum speed detecting sensor 16 to provide a gentle variation. The variation can be used as an amount to be fed back to the driving motor 12.

A correction table 35 stores variation compensation data 36 which can be obtained by measuring density variations due to variations in the relative speed between the transferring head 4 and the recording paper 1 when line transference is executed in a feeding direction. A select signal correspondence table 37 stores the threshold conversion data corresponding to the variation compensation data 36, and generates a threshold conversion curve select signal 33 in response to the compensation data 36 for a certain speed variation. Using this signal 33, the threshold conversion circuit 26 converts the threshold data level to correct the density unevenness for each color. In this case, it should be noted that the density unevenness due to the gentle speed variation can be corrected for each of lines transferred.

Figure 7:
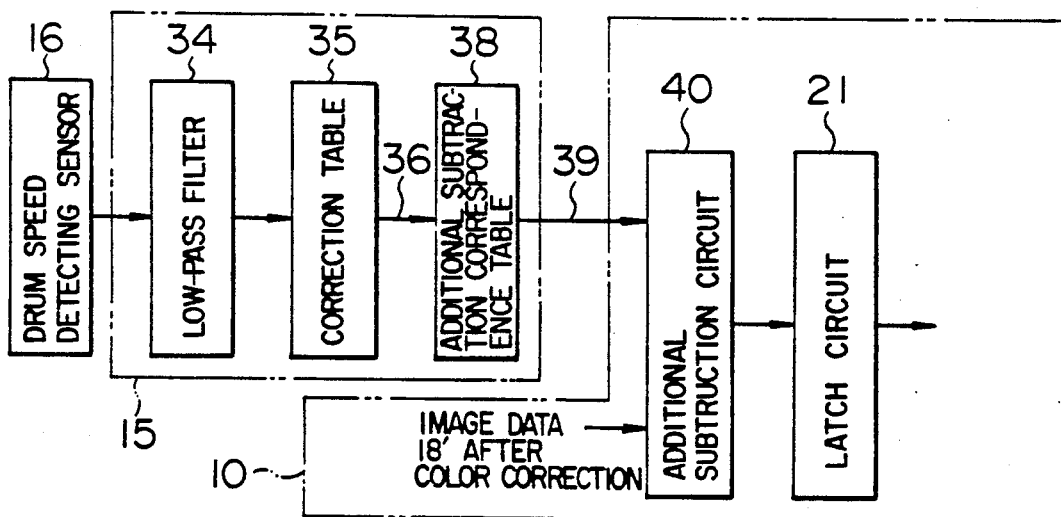

In accordance with the embodiment of FIG. 7, the density unevenness can be reduced for each color and the color unevenness due to overlap of the colors can be also reduced.

FIG. 7 shows another embodiment of the variation compensation circuit 15. The embodiment, instead of selecting the threshold conversion curve 36 corresponding to the variation compensation data 36, increases or decreases the image data 18' in accordance with the variation compensation data 36. An addition/subtraction value correspondence table 38 stores addition/subtraction data 39 corresponding to the variation compensation data 36 sent from the correction table 35.

An addition/subtraction circuit 40 located in the correction processing circuit 10 serves to add the addition/subtraction data 39 to the image data 18'. Specifically, in the case where the variation compensation circuit 15 as shown in FIG. 7 is used, the variation compensation circuit 10 is designed in such a manner that the addition/subtraction circuit 40 is provided at the rear stage of the circuits 19 and 20 in FIG. 3 and the data 39 from the variation compensation circuit 15 is supplied to the addition/subtraction circuit 40. In this case, it should be noted that the data 39 from the variation compensation circuit 15 are not supplied to the threshold conversion circuit 26.

Figure 8:
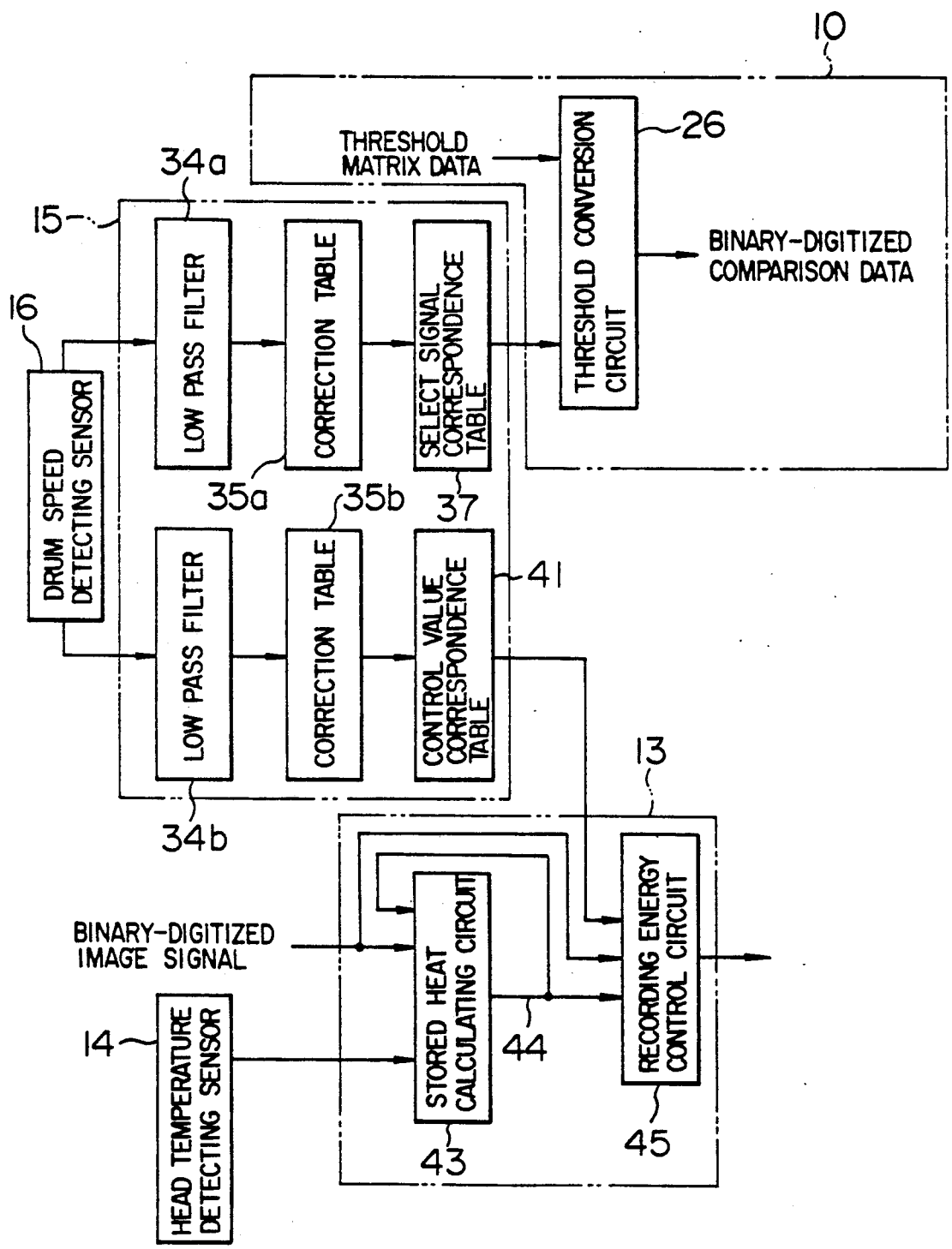
FIG. 8 is a block diagram of the circuit for controlling the threshold conversion curve and transference energy in response to signals from the drum speed detecting sensor.

FIG. 8 shows still another embodiment of the variation compensation circuit 15. In the embodiment, in response to the signal from the drum speed detecting sensor 16, a large variation is compensated by selecting an appropriate threshold conversion curve and a small variation is compensated by controlling the transferring energy. The respective components in FIG. 8 have the same function as those of the corresponding components of FIGS. 6 and 7. Correction tables 35a and 35b are so set that the large variation is corrected by the threshold conversion curve and the small variation is corrected by the transferring energy. Low pass filters 34a and 34b are connected with the correction tables 35a and 35b, respectively.

Figure 9:
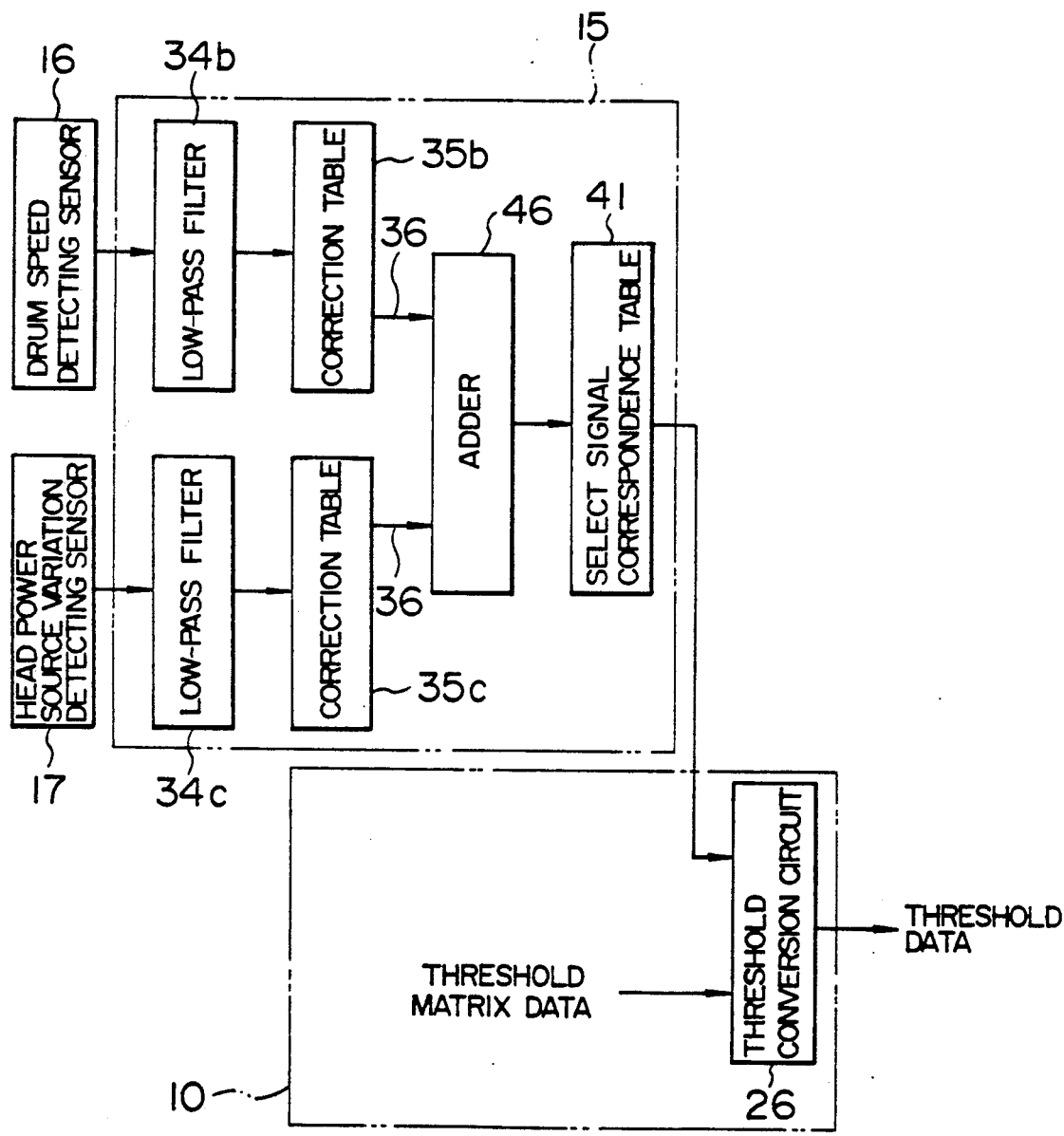
FIG. 9 is a block diagram of the circuit for controlling the transference energy in response to two kinds of signals from the drum speed detecting sensor and a head power supply variation detecting sensor.

FIG. 9 shows a further embodiment of the variation compensation circuit 15. In the embodiment, the speed variation of the drum 2 and the power source variation for the transferring head 4 are fed back to select a desired threshold conversion curve. The speed variation of the drum 2 and the power source variation for the transferring head 4 are individually detected. The signals from the drum speed detecting sensor 16 and the head power source variation detecting sensor 17 are processed to provide the variation compensation data 36 which are, in turn, added to each other by an adder 46. The signal from the adder 46 is supplied to the select signal correspondence table 41. It should be noted that the image data may be controlled instead of the threshold conversion curve. Additionally, in the embodiment, a low pass filter 34c and a correction table 35c are newly provided to process the signal from the head power source variation detecting sensor 17 and the remaining components are the same as those described in connection with FIGS. 6 to 8.

In accordance with the embodiment of FIG. 9, not only unevenness of feeding the recording paper 1 but also the color unevenness due to the power source variation for the transferring head 4 can be reduced.

FIG. 10 shows the threshold values corresponding to the 8×8 threshold matrix stored in the threshold conversion circuit 26. The input image data has the value of "0" to "255". The image data is binary-digitized to "1" or "0" according as its value is larger or smaller than the corresponding threshold value as shown in FIG. 10.

Figure 12:
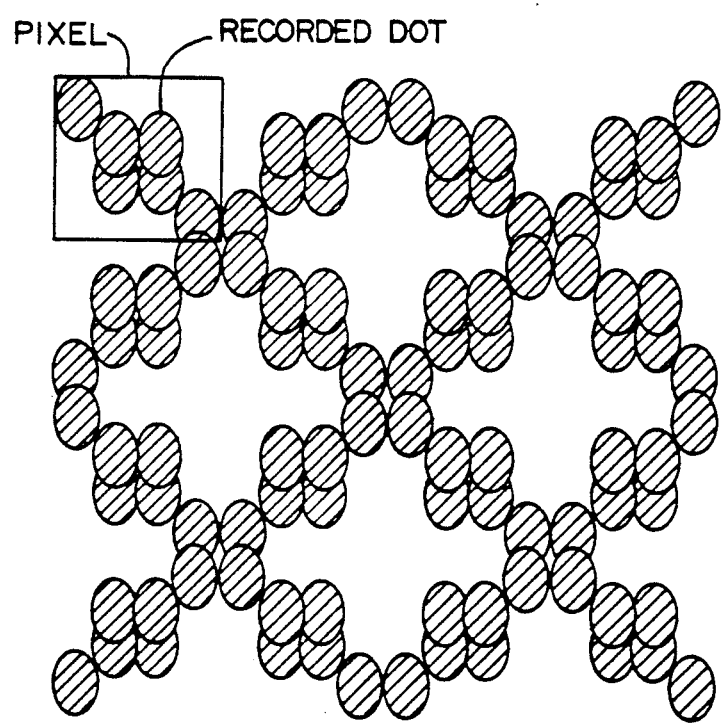
FIG. 12 is a view showing the tone pattern of X-type threshold matrix data.

FIG. 11 shows the matrix of the order of increasing the threshold values of FIG. 10. As seen from FIG. 11, the dot pattern of an "X" character is formed in accordance with the increasing tone of the image data. The matrix of FIG. 11 providing such an "X" dot pattern will be referred to as an X type threshold matrix. Unlike the conventional flattering dot type or Bayer type, this X type threshold matrix serves to transfer dots in oblique directions within one pixel and form a tone pattern similar to a four-leaf clover by four pixels; the tone patterns thus formed are also coupled with each other in oblique directions. FIG. 12 shows the tone pattern in which six dots are transferred in one pixel; this pattern typically represents the feature of the X-type threshold matrix. This X-type threshold matrix has a dot arrangement in which white regions are unified and dots are coupled in the order from a lower tone.

Now, attention is paid to a dot pattern 4×4 within one pixel. In this case, the first four dots are transferred on columns different from one another for the following reason. The transferred dot has an oblong shape so that in the flattering dot type, the fifth or seventh dot is first transferred on a new column. This increases the area occupied by the transferred dots, thus providing a tone gap. In the X-type matrix in which the first four dots are transferred in different columns, transference with no overlap of dots in a zone with a low transference density does not result in a remarkable tone gap. The pixels will 'swell' in oblique directions from the center of the image on the basis of the four dots described above.

In accordance with the embodiment using the above X-type threshold matrix, color transference with each color transferred with the same threshold matrix does not result in so remarkable color unevenness as compared with the case using the conventional threshold matrix.

FIGS. 13 to 16 show other threshold matrices. In these matrices, basically, the number of dots is increased in oblique directions of 45° to form an X-shape tone pattern of dots. In the threshold matrix of 3×3 as shown in FIG. 13, dots are transferred in the oblique direction in the order of 1, 2 and 3. In the threshold matrix of 5×5 as shown in FIG. 14, dots are transferred in the oblique direction in the order of 1, 2, 3, 4 and 5. In the threshold matrix of 7×7, a large pixel makes the image quality coarse. In order to obviate this, four basic 4×4 threshold matrices are arranged with an overlap of single row and single column to provide the tones of the transferred dots in four oblique directions. In the threshold matrix of 9×9, four basic 4×4 threshold matrices are arranged to provide the tones of the transferred dots in four oblique directions and a gap of single row and single column is also transferred from the center of the matrix, thus providing the tones in the four oblique directions as a whole. Other matrices in which dots are transferred to continue in four oblique directions should be included in the X-type threshold matrix. For example, in the threshold matrix in which the density pattern method of 4×4 is combined with the dizzer method, dots can be arranged to continue in four oblique directions.

Now referring to FIGS. 17 to 19, an explanation will be given of the method for reducing the color unevenness by overlapping transference of the above patterns displaced using three colors of YMC.

Figures 19, 20:
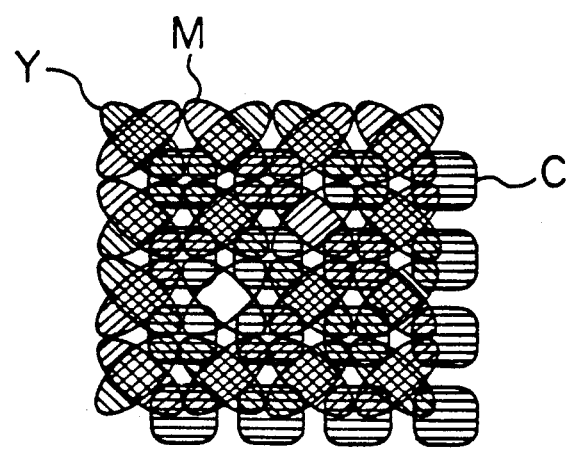

FIGS. 17 to 19 show the threshold matrices of Y, M and C in the overlapping transference, respectively. The threshold matrix of Y as shown in FIG. 17 has a X-type pattern of transferred dots continuing in oblique directions in the overlapping transference. The threshold matrix of M as shown in FIG. 18 is the result obtained by shifting the threshold matrix of Y by four rows downward. The threshold matrix as shown in FIG. 19 is a flattering dot type threshold matrix in which transferred dots succeed in vertical and horizontal directions and is obtained by shifting the pixel center of the threshold matrix of Y by two rows and two columns. Overlapping transference of these matrices results in a half tone pattern as shown in FIG. 20. As seen from the figure, with the colors displaced from each other, the protruding portion and the overlapping portion in the pattern compensate for each other to prevent the color unevenness from being conspicuous. The pixel pitch (distance between pixel centers) for each color is 4 dots (250 μm) as in the fattering dot type matrix with a minimum pixel pitch so that the tone of the image for each color can be represented with a minimum pixel pitch which is shorter than the conventional technique of reducing the color unevenness using a screen corner. Therefore, sense of the resolution of the image is not reduced as compared with the above screen corner processing. Furthermore, the screen corner processing, in which the pixel centers for respective colors overlap with a certain period, will necessarily give rise to color divergence. On the other hand, the embodiment in which the pixel centers do not overlap each other, will not give rise to the color divergence.

Unlike the screen corner processing, in accordance with this embodiment, the color unevenness can be reduced and the color divergence can be eliminated without increasing the pixel pitch.

In the embodiments described above which intend to process the color image at a high speed, the variation compensation circuit and correction processing circuit are constructed in hardware. However, the color image may be processed in real time using a high speed computer in the following manner.

Figure 21:
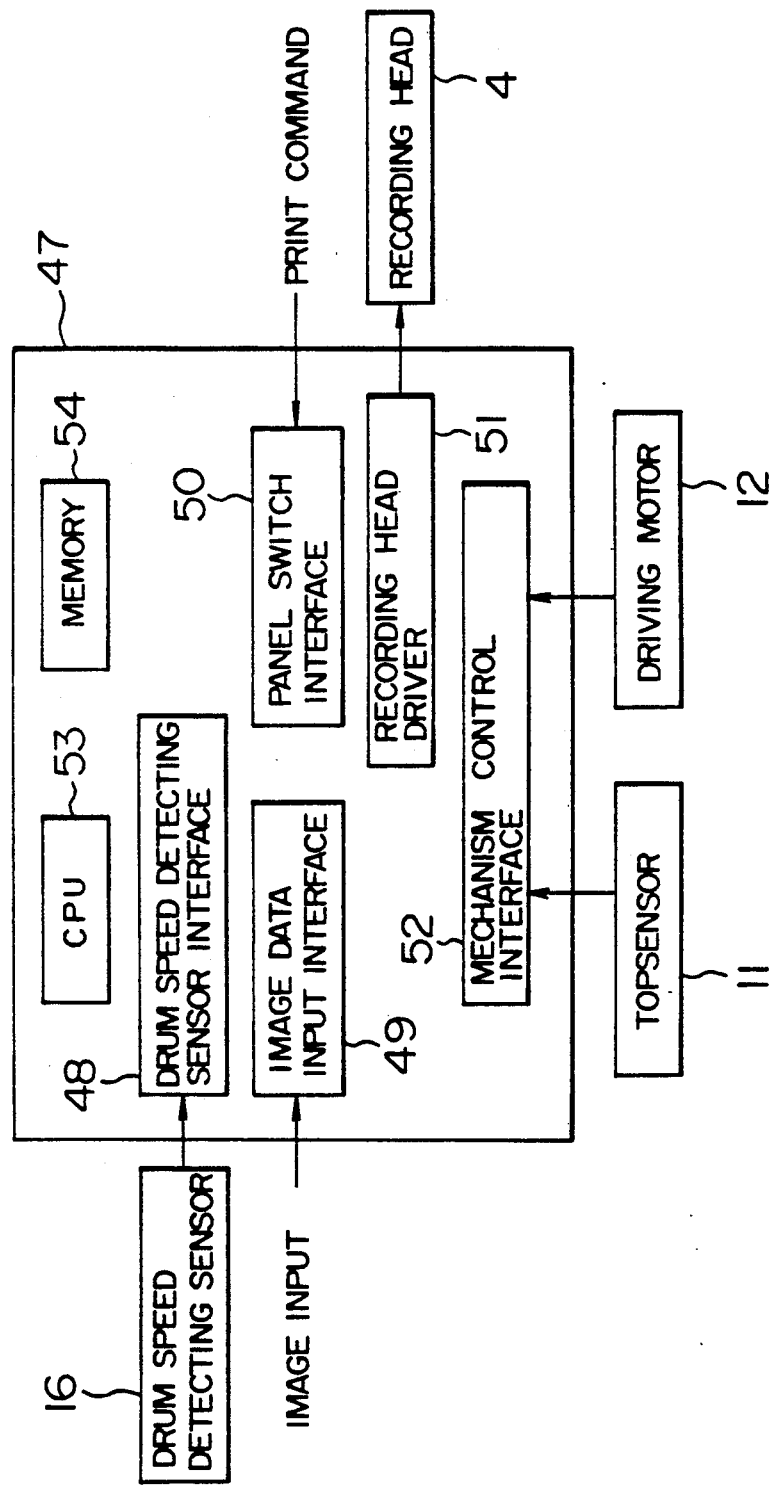
FIG. 21 is a block diagram of another arrangement of the present invention.

FIG. 21 is a block diagram of an embodiment of processing the color image using a computer. In FIG. 21, like reference numerals refer to like elements in FIG. 1. The following operations will be carries out in a computer 47. In order to a relative speed variation between the recording paper 1 and the transferring head 4, a drum speed detecting sensor interface 48 takes a signal from the drum speed detecting sensor 16. An image data input sensor 16 takes the image data of RGB or YMC. A panel switch interface 50 takes a printer command signal and several kinds of setting signals which are sent from a panel not shown. A transferring head driver 51 drives the transferring head 4 in accordance with the image data to be transferred. A mechanism control interface takes a signal of notifying start of transference sent from the top sensor 11 and produces a signal of driving the driving motor 12 for rotating the drum 2. Other sensors or motors for controlling the mechanism, which are not main components of the computer 47, are not shown. Both CPU 53 and a memory 54 serve to execute programs and control a series of operations.

Figure 22:
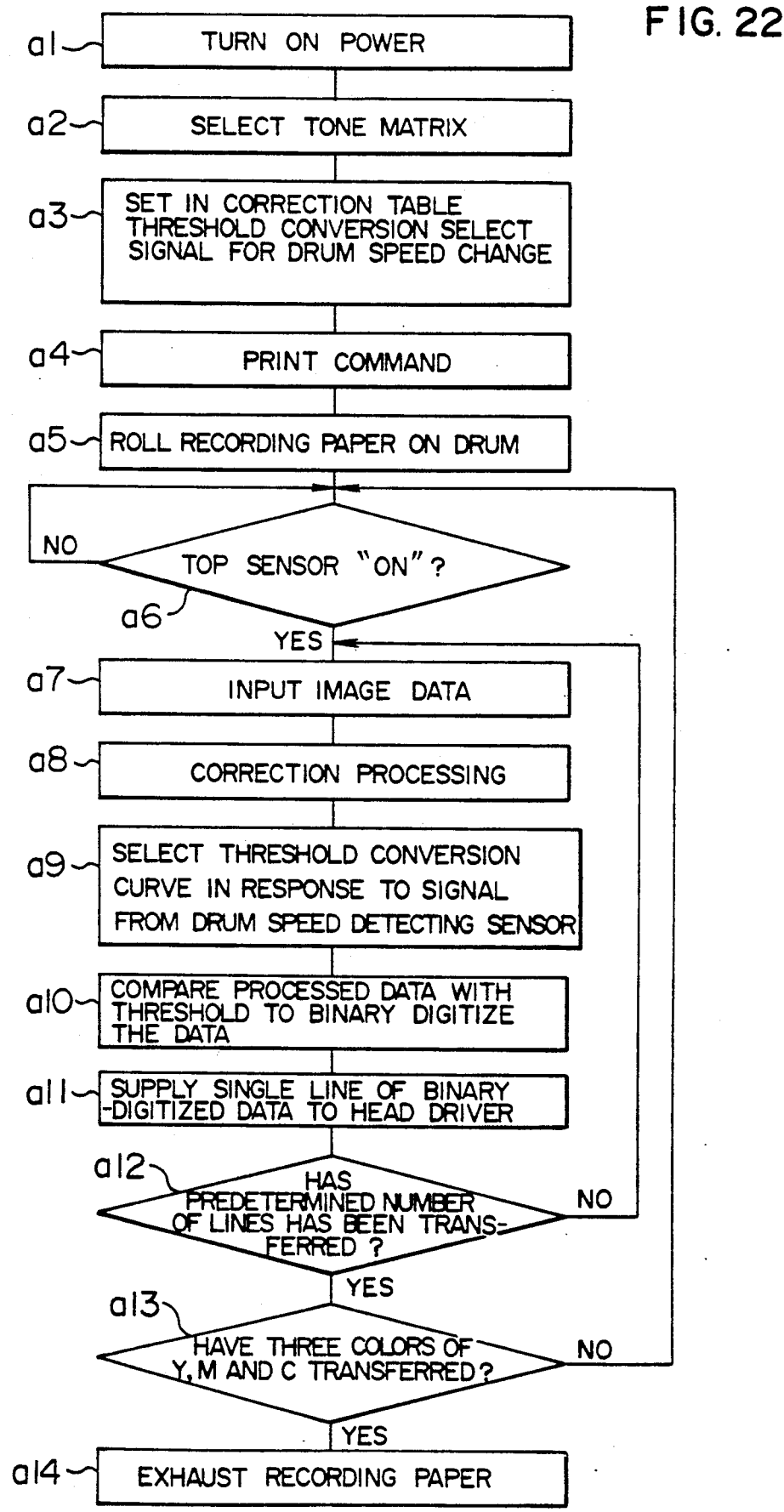
FIGS. 22 and 23 are a flowchart of the operations in the embodiment shown in FIG. 21.

The operation of the computer 47 will be explained with reference to the flowchart of FIG. 22.

In step a1, the power is turned on to initialize the program. In step a2, a tone matrix is selected in accordance with the designation from a panel or host computer. In step a3, in order to compensate the color unevenness of due to a speed variation in the drum 2, the transferring energy (the width of a pulse to be applied) corresponding to the speed variation is tabulated on the memory 54.

In step a4, a print command is issued to start a printing sequence. First, in step a5, the recording paper 1 is supplied to be rolled on the drum 2. In step a6, decision is made whether or not the top sensor 11 which notifies that the recording paper 1 has come to the starting point of transference, has turned on. If the decision is 'YES', in step a7, the transference of the image data is started. Namely, in step a8, the image data taken by the image data input interface 49 is subjected to the image processing such as tone correction and color correction and is binary-digitized to provide a transference data. In step a9, the signal from the drum speed detecting sensor 16 is taken to select a threshold conversion curve. In step a10, comparison is made between the image data processed in step a8 and the threshold data corresponding to the threshold conversion curve selected in step a9 to binary-digitize the image data. In step a11, the binary-digitized data are successively sent to the head driver 51. In step a11, decision is made whether or not a predetermined number of lines have been transferred. If the decision is 'YES', transference for a next color will be executed (step a13). When the transference for three colors has been completed, the recording paper is exhausted (step a14).

Figure 23:
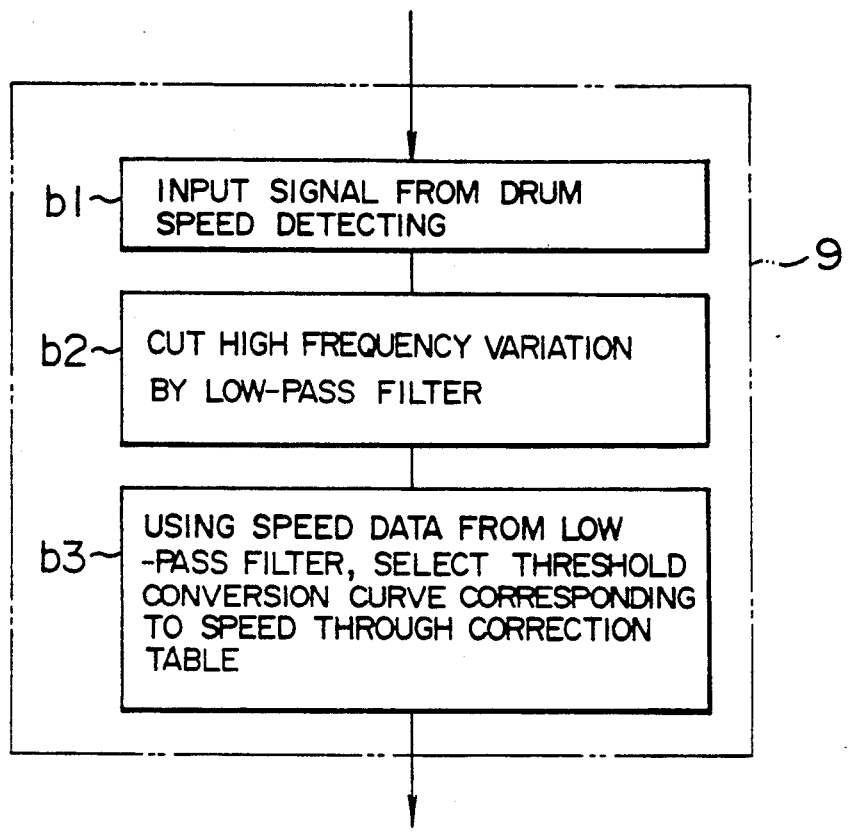
Figure 24:
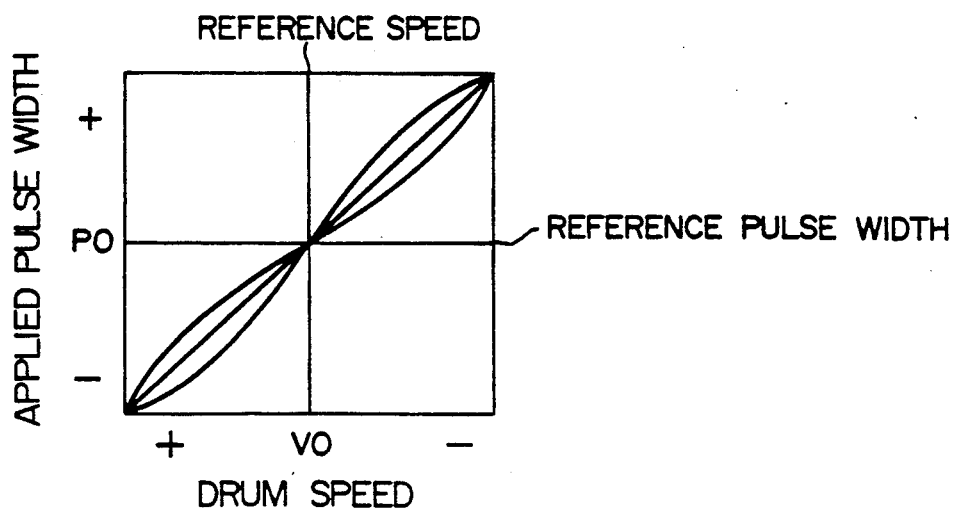
FIG. 24 is a graph showing a correction curve of a speed variation versus transferring energy.
Figure 25:
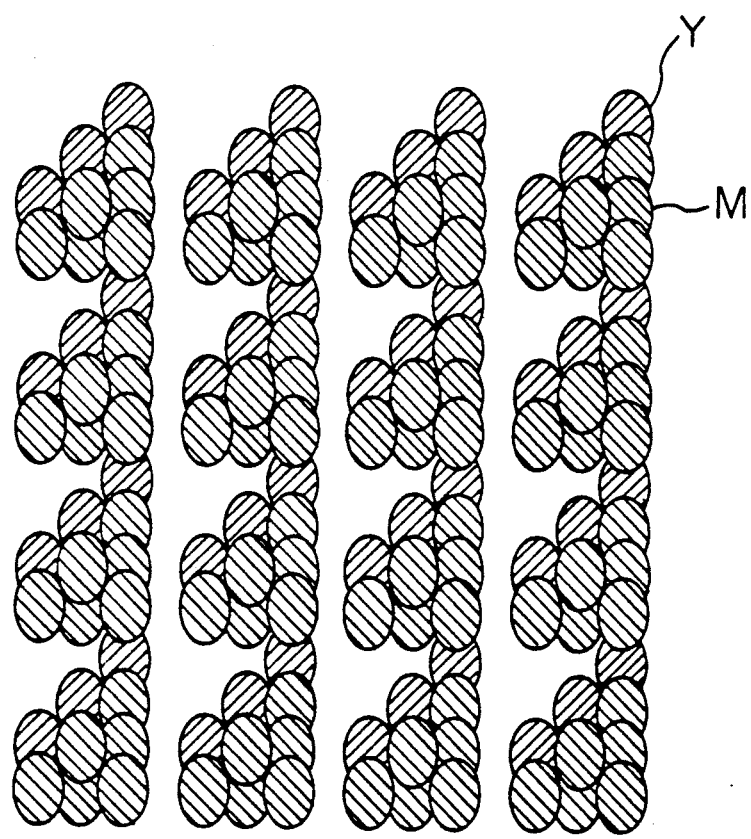
FIG. 25 shows a view for explaining the color unevenness when a flattering dot type threshold matrix data are adopted in a conventional type.

Now referring to the flowchart of FIG. 23, a method for controlling the transferring energy to carry out step a9 will be explained. It should be noted that the variation compensation circuit 15, correction processing circuit 10 and head controlling circuit 13 can be used in any of the embodiments of FIGS. 6 to 9. In step b1, a signal from the drum speed detecting sensor 16 is input. In step b2, the high frequency component of the input signal is cut by the low pass filter (34, 34a, 34b, 34c). The color evenness with a period of about 5 mm or less is not conspicuous so that only the undulation having the period larger than the period is taken up. If the speed data from the low pass filter (34, 34a, 34b, 34c) is lower than the reference speed, the moving distance of the ink film will become short correspondingly. Thus, the area of dots transferred will become small so that the density of the corresponding region becomes low. If one pixel of an input image data is designed in a 4×4 tone matrix, the tone is represented by the number and pattern of dots transferred, reduction of the density can be compensated by increasing the number of dots transferred. The number of dots transferred can be increased by reducing the threshold data which is to be compared with the input image data. The threshold data can be reduced by selecting one of the threshold conversion curves located right with respect to the basic threshold conversion curve as shown in FIG. 5. Furthermore, if the power supply voltage is reduced, the transferring energy will be also reduced, thereby reducing the area of dots transferred. Therefore, in this case also, one of the threshold conversion curves should be selected. Which one of the threshold conversion curves should be selected, is determined by taking one of the threshold conversion curve select signals previously tabulated corresponding to changes (step b3).

The above sequence is executed in the same manner for Y, M and C.

The correction table on the memory 54 sets the width of a pulse to be applied corresponding to a drum speed for a line, S-curve and N-curve one of which is found to be more suitable on the basis of an experiment result is selected. If the drum speed is located on the + side of the reference speed V0, the width of a pulse to be applied will be set for the value which is larger than a reference pulse width P0. If the drum speed is located on the − side of the reference speed V0, the width of a pulse to be applied will be set for the value which is smaller than the reference pulse width P0. Different correction curves may be given for Y, M and C.

In accordance with the embodiment, the density unevenness and the color unevenness due to a variation in the relative speed between the transferring head 4 and the recording paper 1 can be reduced.

Instead of controlling the transferring energy, the binary-digitized threshold value or the input image data may be modified. Both changes in the relative speed between the recording paper 1 and the transferring head 1 and the power source for the transferring head 4 may be fed back.

The color image transferring method according to the present invention may be applied to not only a fused-type thermal printer, but also any other digital transferring method, and further may be combined with multi-value transference.

In accordance with the present invention, the following meritorious advantages can be obtained.

Variations in the relative speed between a transferring head and a recording paper and in the power source for the transferring head can be compensated to reduce the color unevenness of a transferred image.

Furthermore, an X-type tone pattern can be used to represent an intensified tone in the color unevenness reduced. Shifting the above X-type tone pattern can reduce the color unevenness and eliminate the color divergence without increasing the pixel pitch.

We claim:

1. A color image transferring method using a threshold matrix table in which threshold matrix data for defining the tone of color image data to be transferred on a recording paper are arranged two-dimensionally corresponding to dots constituting said image data, said dots are compared with the threshold values, and on the basis of the comparison result, the image data with the tone adjusted are transferred on the recording paper, comprising the steps of:

selecting threshold matrix data corresponding to the dots constituting the image data having the tone to be transferred from said threshold matrix data table;

selecting first threshold conversion curve previously defined from a threshold conversion circuit corresponding to the tone of said selected threshold matrix data;

correcting said selected first threshold conversion curve using a second threshold conversion curve selected from second threshold conversion curves previously defined in said threshold conversion circuit on the basis of a mechanical and electrical variations in a color image transferring apparatus;

converting said threshold matrix data selected by said threshold conversion circuit into threshold data on the basis of said selected second threshold conversion curve;

comparing the threshold data with dots corresponding to single line of said image data thereby to produce a binary-digitized image signal with "1" or "0" according to as said single line of dots is larger or smaller than said threshold data; and supplying the binary-digitized image signal produced to a transferring head to be transferred on said recording paper.

2. A color image transferring method according to claim 1, wherein when said binary-digitized signal is "1", the binary-digitized signal is transferred from said transferring head onto said recording paper, and when said binary-digitized signal is "0", the binary-digitized signal is not be transferred.

3. A color image transferring method according to claim 1, wherein said mechanical and electrical variation includes variations in the relative position between said transferring head and said recording paper in transference, electric energy to be supplied to said transferring head and in the speed of a transferring drum.

4. A color image transferring method according to claim 1, wherein said dot is a minimum unit of the said binary-digitized imaged signal to be transferred on the recording paper, and when the pixel arrangement of the image data to be transferred of 512×512, and one pixel of 8×8 dots, the threshold matrix data of 8×8 is selected from said threshold matrix data table in response to a threshold matrix select signal, single line of 8×8 dots is successively compared with single line of the image data of 512×512 pixels, i.e., 8×512=4096 dots are compared by 8 (eight) times to produce 4096 binary-digitized image signals.

5. A color image transferring method according to claim 1, wherein said threshold value matrix table including a plurality of threshold value matrix data of 3×3, 4×4 or 5×5 which are arranged in a square shape, transferring dots in each threshold matrix data change in the low tone toward the high tone with a slope in the square shape, and relationship between the threshold matrix data of changing direction of the dots is vertically and horizontally symmetric alternately with respect to the center of said matrix table.

6. A color image transferring method according to claim 1, wherein said matrix data table includes the threshold matrix data of 4×4 arranged with an overlap of single row and single column so that the tone changes with slopes in four directions from the center of said threshold matrix table.

7. A color image transferring method according to claim 1, wherein said threshold matrix data of 4×4 is arranged with a gap of single row and single column so that the tone changes with slopes in four direction from the center of said threshold matrix table and also the gap of single row and single column is transferred starting from the center.

8. A color image transferring method according to claim 1, wherein said threshold matrix table is combined with a fattering dot type threshold matrix data in which transferring dots changes vertically and horizontally from its center so that the centers of pixels transferred for each color are obliquely displaced in vertical and horizontal directions.

9. In a color image transferring apparatus comprising a transferring drum on which a recording paper on which image data are to be transferred is rolled, a motor for driving the transferring drum, a transferring head in contact with the recording paper through an ink film, and a central processing circuit for supplying electric energy corresponding to the image data to control transference of said image data on said recording paper, said color image transferring apparatus comprising:

a threshold matrix table on which the threshold matrix data selected by a threshold matrix select signal which is produced by said central processing circuit when the transference of said image data is started, said threshold matrix data corresponding to the tone of dots included in said image data corresponding to the tone of said image data to be transferred;

a threshold conversion circuit including a predetermined first threshold conversion curve to be selected in accordance with the tone of said threshold matrix data selected, and a plurality of second threshold curves one of which is selected to correct said first threshold curve in accordance with a mechanical and electrical variation in said color image transferring apparatus when said first threshold conversion curve is selected, and serves to convert said threshold matrix data into binary-digitized threshold data on the basis of said second threshold conversion curve selected;

a comparison circuit for comparing the binary-digitized threshold data with dots corresponding to single line of said image data to be transferred thereby to produce a binary-digitized image signal with a corrected tone of "1" or "0" according to as said single line of dots is larger or smaller than said threshold data; and a transferring head controlling circuit for supplying said binary-digitized image signal to said transferring head.

10. A color image transferring apparatus according to claim 9, wherein when said binary-digitized signal produced from said comparison circuit is "1", the binary-digitized signal is transferred from said transferring head onto said recording paper, and when said binary-digitized signal is "0", the binary-digitized signal is not transferred.

11. A color image transferred apparatus according to claim 9, wherein said mechanical and electrical variation indicates a signal produced from a variation compensation circuit which includes variation in the relative position between said transferring head and said recording paper in transference, electric energy to be supplied to said transferring head and in the speed of a transferring drum.

12. A color image transferring apparatus according to claim 9, wherein said comparison circuit includes a buffer in which stores single line of dots used to transfer on the transferring drum said binary digitized image signal produced from said comparison circuit.

13. A color image transferring apparatus according to claim 9, wherein said dot is a minimum unit of the said binary-digitized image signal to be transferred on the recording paper, and when the pixel arrangement of the image data to be transferred of 512×512, and one pixel of 8×8 dots, the threshold matrix data of 8×8 is selected from said threshold matrix data table in response to a threshold matrix select signal, single line of 8×8 dots is successively compared with single line of the image data of 512×512 pixels, i.e., 8×512=4096 *dots* are compared by 8 (eight) times to produce 4096 binary-digitized image signals.

14. A color image transferring apparatus according to claim 9, wherein said control circuit controls the transferring energy in response to the signal indicative of the mechanical and electrical change supplied from said variation compensation circuit, when said binary-digitized signal is supplied to said transferring head.

* * * * *